US009725126B2

(12) United States Patent
Yeh

(10) Patent No.: US 9,725,126 B2
(45) Date of Patent: Aug. 8, 2017

(54) VEHICLE-TO-VEHICLE CONNECTOR

(71) Applicant: GAUSS INNOVATION DESIGN CO., Zhubei, Hsinchu County (TW)

(72) Inventor: Shih-Lin Yeh, Zhubei (TW)

(73) Assignee: GAUSS INNOVATION DESIGN CO., Zhubei, Hsinchu County (TW)

(*) Notice: Subject to any disclaimer, the term of this patent is extended or adjusted under 35 U.S.C. 154(b) by 0 days.

(21) Appl. No.: 14/993,633

(22) Filed: Jan. 12, 2016

(65) Prior Publication Data
US 2016/0200388 A1 Jul. 14, 2016

(30) Foreign Application Priority Data

Jan. 14, 2015 (TW) ............................ 104101141 A

(51) Int. Cl.
*B62K 27/12* (2006.01)
*B62K 13/02* (2006.01)
*B60D 1/00* (2006.01)

(52) U.S. Cl.
CPC ............ *B62K 13/025* (2013.01); *B62K 27/12* (2013.01); *B60D 2001/003* (2013.01); *B62K 2710/12* (2013.01)

(58) Field of Classification Search
CPC .. B62K 13/025; B62K 2710/12; B62K 27/12; B60D 2001/003
See application file for complete search history.

(56) References Cited

U.S. PATENT DOCUMENTS

| | | | | |
|---|---|---|---|---|
| 605,799 A * | 6/1898 | Ripley | ................... | B62K 27/12 280/292 |
| 2,271,255 A * | 1/1942 | Du Bois | .................. | B62K 5/01 280/489 |
| 2,725,242 A * | 11/1955 | Peplin | .................. | B62K 27/003 280/204 |
| 4,261,592 A * | 4/1981 | Busseuil | .............. | B62K 27/003 280/292 |
| 5,330,217 A * | 7/1994 | McCarthy | ................ | B60D 1/00 280/204 |
| 5,716,065 A * | 2/1998 | Liu | ........................... | B62K 5/02 280/204 |
| 5,743,543 A * | 4/1998 | Chiu | ..................... | B62K 27/006 280/231 |
| 5,749,592 A * | 5/1998 | Marchetto | ............ | B62K 13/025 280/204 |
| 5,842,710 A * | 12/1998 | Couture | ............... | B62K 27/006 280/204 |
| 6,050,580 A * | 4/2000 | Pawelek | .................. | B60D 1/00 280/204 |
| 6,155,582 A * | 12/2000 | Bourbeau | .............. | B62K 27/12 280/204 |

(Continued)

*Primary Examiner* — Kevin Hurley
*Assistant Examiner* — Gabriela C Craciun
(74) *Attorney, Agent, or Firm* — Muncy, Geissler, Olds & Lowe, P.C.

(57) ABSTRACT

A vehicle-to-vehicle connector includes a first component and a second component. The first component is configured to be connected with a first vehicle body, and a second component is configured to connect a second vehicle body with the first vehicle body. The second vehicle body includes a front wheel assembly, a stem and a handle bar, and the front wheel assembly, the stem and the handle bar lean toward a direction opposite a moving-forward direction of the first vehicle body.

11 Claims, 10 Drawing Sheets

(56) References Cited

U.S. PATENT DOCUMENTS

| | | | | |
|---|---|---|---|---|
| 6,270,100 B1* | 8/2001 | Wunderlich | .......... | B62K 27/14 |
| | | | | 280/204 |
| 6,561,533 B2* | 5/2003 | Snobl | ..................... | B62K 27/12 |
| | | | | 280/204 |
| 6,623,021 B1* | 9/2003 | Nelson | .................... | B62H 5/02 |
| | | | | 280/204 |
| 6,983,947 B2* | 1/2006 | Asbury | ................. | B62K 27/12 |
| | | | | 280/204 |
| 7,234,719 B2* | 6/2007 | Giese | .................... | B62K 27/12 |
| | | | | 280/292 |
| 7,669,868 B2* | 3/2010 | Underhaug | .............. | B62H 7/00 |
| | | | | 280/204 |
| 7,766,358 B1* | 8/2010 | Phillips | ................. | B62K 13/02 |
| | | | | 280/204 |
| 9,033,355 B2* | 5/2015 | Lin | ........................ | B62K 27/00 |
| | | | | 280/202 |
| 2006/0186634 A1* | 8/2006 | Giese | .................... | B62K 27/12 |
| | | | | 280/292 |
| 2013/0022390 A1* | 1/2013 | Lin | ........................ | B62K 27/12 |
| | | | | 403/58 |
| 2014/0091551 A1* | 4/2014 | Walter | ................... | B62K 13/04 |
| | | | | 280/267 |
| 2015/0115573 A1* | 4/2015 | Bossel | .................. | B62K 27/12 |
| | | | | 280/504 |
| 2016/0023712 A1* | 1/2016 | Petit-Frere | .......... | B62K 13/025 |
| | | | | 280/292 |

* cited by examiner

VEHICLE-TO-VEHICLE CONNECTOR

This application claims the benefit of the filing date of Taiwan Application Ser. No. 104101141, filed on Jan. 14, 2015, the content of which is incorporated herein by reference.

BACKGROUND a. Field of the Invention

The invention relates generally to a kind of mechanism, and more particularly, to a vehicle-to-vehicle connector configured to combine at least two vehicle bodies.

b. Description of the Related Art

When children are accompanied by a parent to ride on bicycles, the children may easily get tired and need the parent's assistance to drag their bicycles. This, however, is a potentially dangerous situation. In order to prevent the safety problem, a conventional bicycle connection device 100 shown in FIG. 1 may be used to connect a vehicle body B1 (parent's bicycle) with a vehicle body B2 (children's bicycle).

However, a front wheel of the vehicle body B2 (children's bicycle) may be raised up when the bicycle connection device 100 is connected to the vehicle bodies to increase the load on the vehicle body B1. In that case, it is not proper for an elder child or adult to ride on the vehicle body B2 and ride for a long distance, and the vehicle body B1 being ridden is liable to lose balance at its rear wheel and is difficult to control the moving direction.

BRIEF SUMMARY OF THE INVENTION

The invention relates, in one embodiment, a vehicle-to-vehicle connector configured to combine at least two vehicle bodies.

An aspect of the invention relates to a vehicle-to-vehicle connector capable of stabilizing the center of gravity of two combined vehicle bodies.

Another aspect of the invention relates to a vehicle-to-vehicle connector favorable for the control of turning directions of two combined vehicle bodies.

Another aspect of the invention relates to a vehicle-to-vehicle connector that eases the combination and separation of two vehicle bodies.

According to an embodiment of the invention, a vehicle-to-vehicle connector include a first component and a second component. The first component is configured to be connected with a first vehicle body, and a second component is configured to connect a second vehicle body with the first vehicle body. The first component includes a first holding member and a first joint, and the first holding member rotates about a first axial direction of the first joint. The first holding member includes a first resilient member, and the second component includes a second holding member. The second vehicle body includes a front wheel assembly, a stem and a handle bar, and the front wheel assembly, the stem and the handle bar lean toward a direction opposite a moving-forward direction of the first vehicle body. When the vehicle-to-vehicle connector connects the first vehicle body with the second vehicle body and the first vehicle body turns to move in a selected direction, the second vehicle body is disposed as a follower to be turned following the selected direction of the first vehicle body and moved along with the first vehicle body. The first holding member and the second holding member may have a resilient member that enables the second holding member to move up and down corresponding to different levels of the ground.

According to the above embodiments, a holding member may rotate about an axial direction of a joint or move up and down by using a resilient member to realize the freedom of movement and allow for a position adjustment to a front wheel of the second vehicle body, so that the front wheel of a moving second vehicle body can be grounded. Besides, a front wheel assembly, a stem and a handle bar of the second vehicle body may lean toward a direction opposite a moving-forward direction of the first vehicle body, so that the second vehicle body is disposed as a follower to be turned following the moving direction of the first vehicle body to realize a steady ride for a combination of two vehicle bodies.

Other features and advantages of the present invention will immediately be recognized by persons of ordinary skill in the art with reference to the attached drawings and detailed description of exemplary embodiments as given below.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
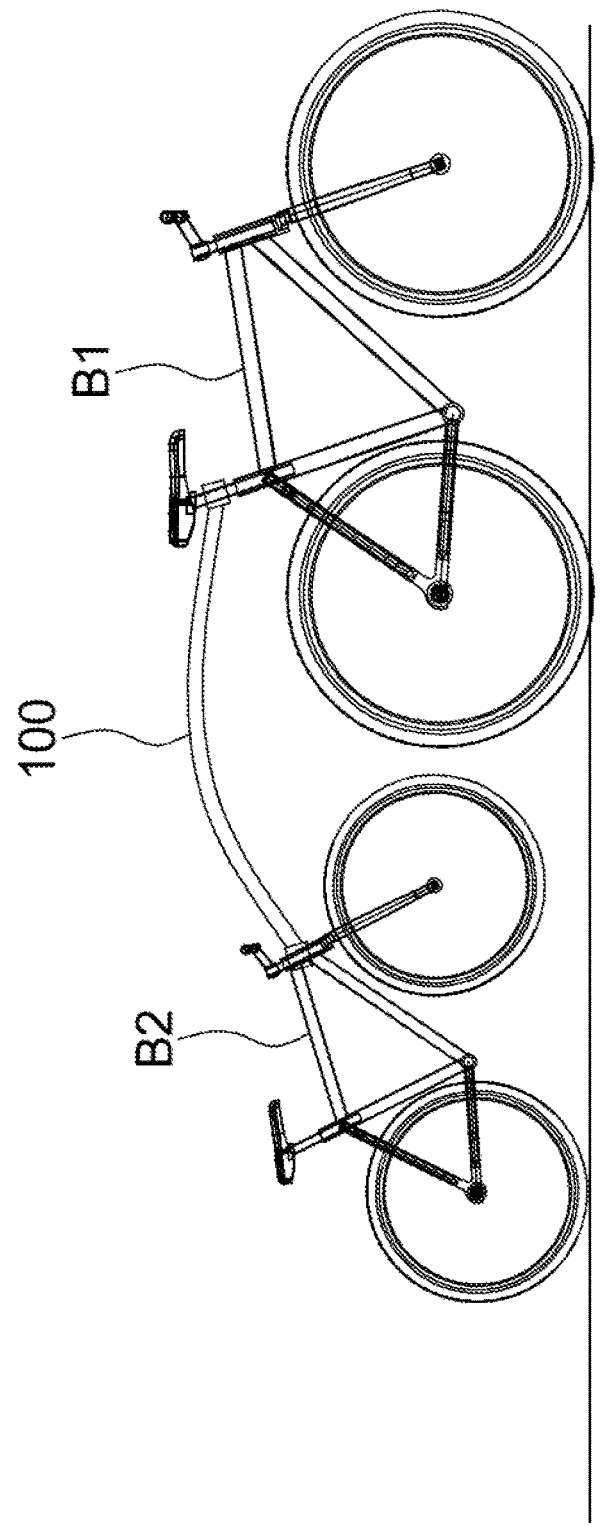
FIG. 1 shows a schematic diagram illustrating a conventional bicycle connection device.
Figure 2A:
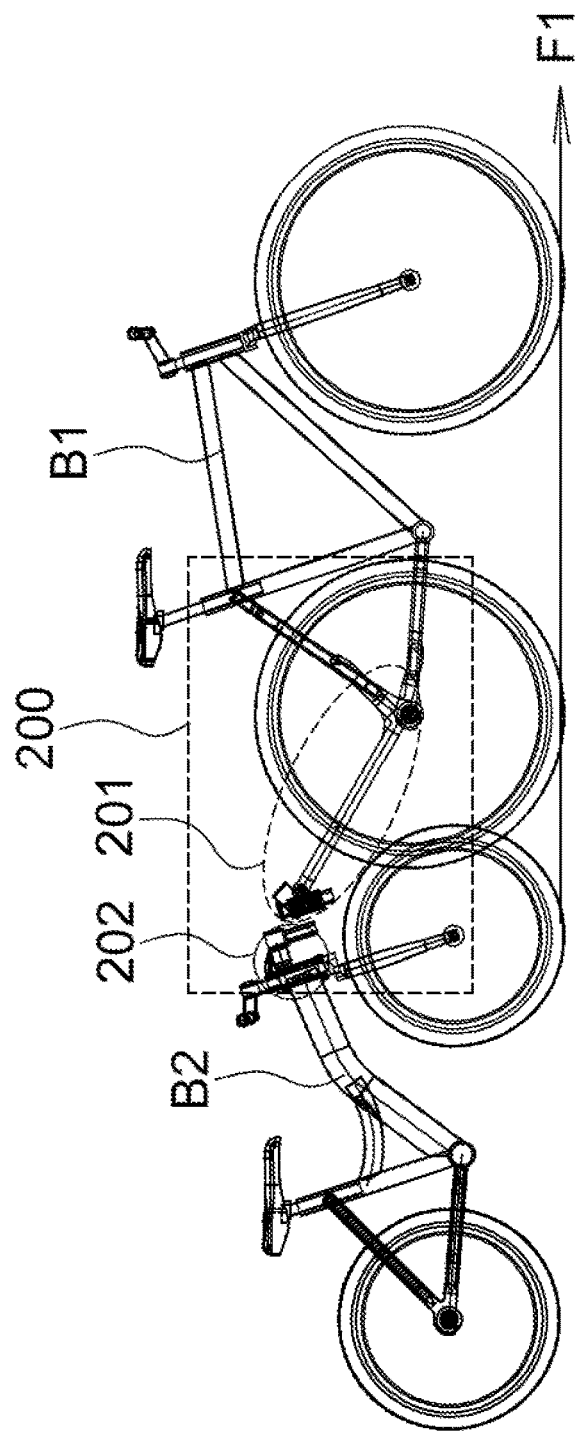
FIG. 2A shows a schematic diagram illustrating a vehicle-to-vehicle connector according to an embodiment of the invention.

FIG. 2A shows a schematic diagram illustrating a vehicle-to-vehicle connector 200 according to an embodiment of the invention, where the vehicle-to-vehicle connector 200 connects a first vehicle body B1 with a second vehicle body B2. Each of the first vehicle body B1 and the second vehicle body B2 may be a vehicle having at least two wheels, such as a bicycle, an electric bicycle, a motor cycle, etc.

Figure 2B:
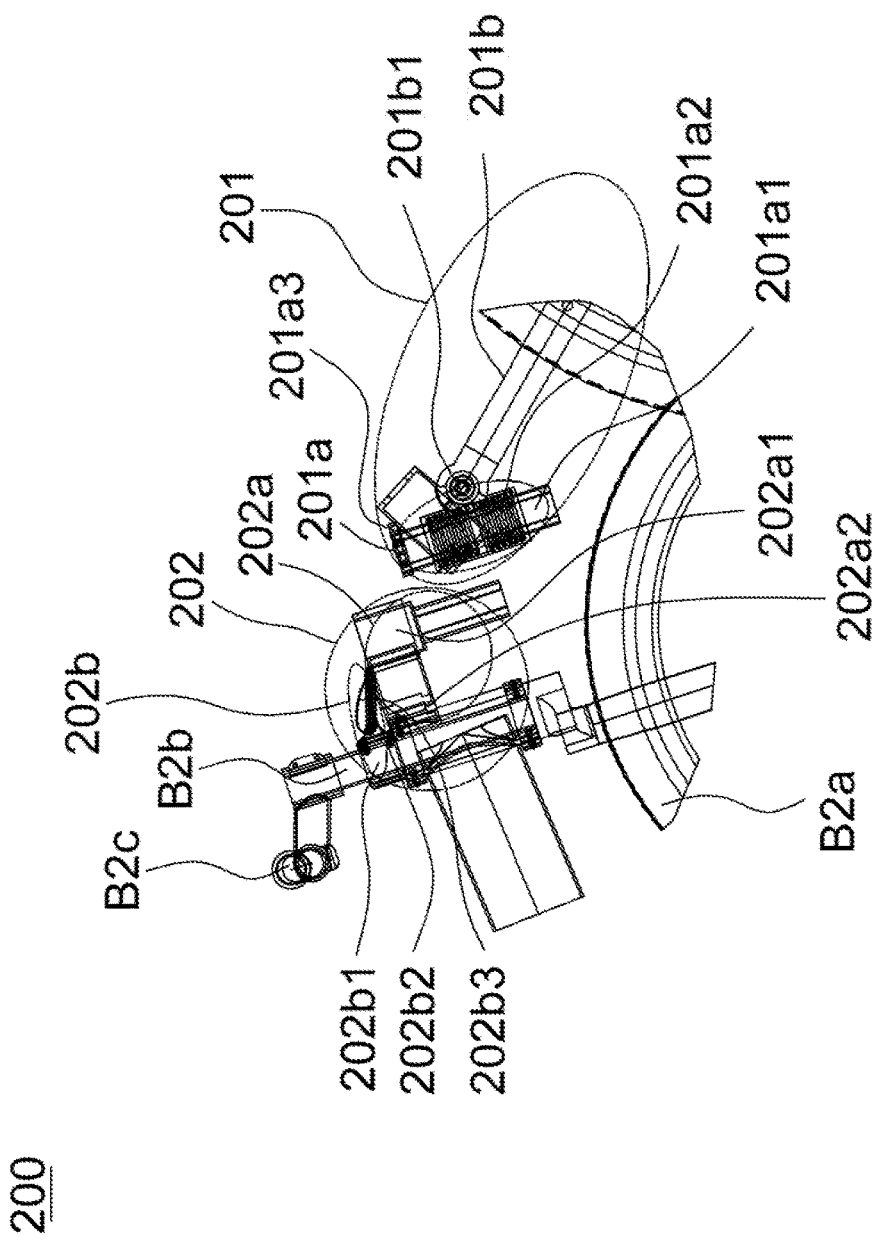
FIG. 2B and FIG. 2C show enlarged partial diagrams of the vehicle-to-vehicle connector.
Figure 2C:
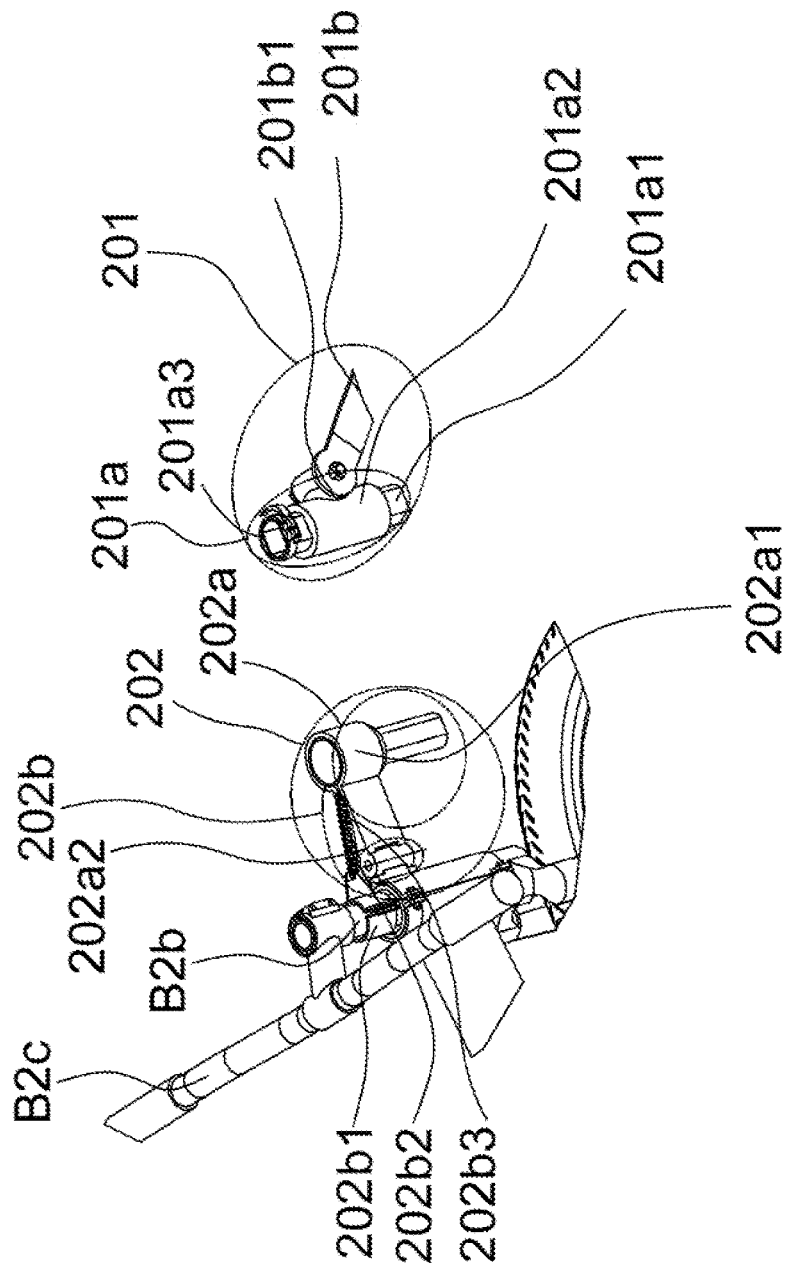
Figure 2D:
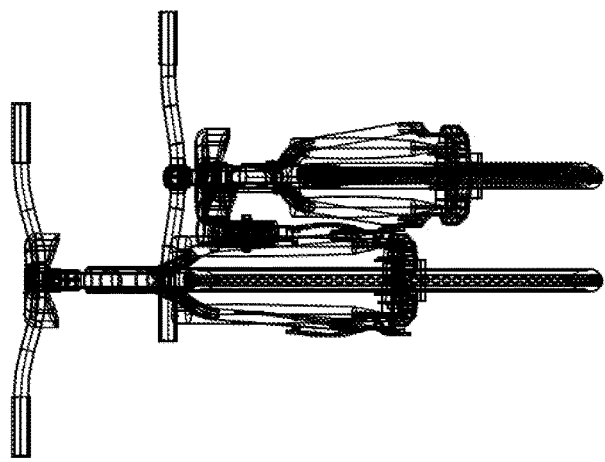
FIG. 2D shows a front view of the vehicle-to-vehicle connector in connection with the a first vehicle body and a second vehicle body.
Figure 2E:
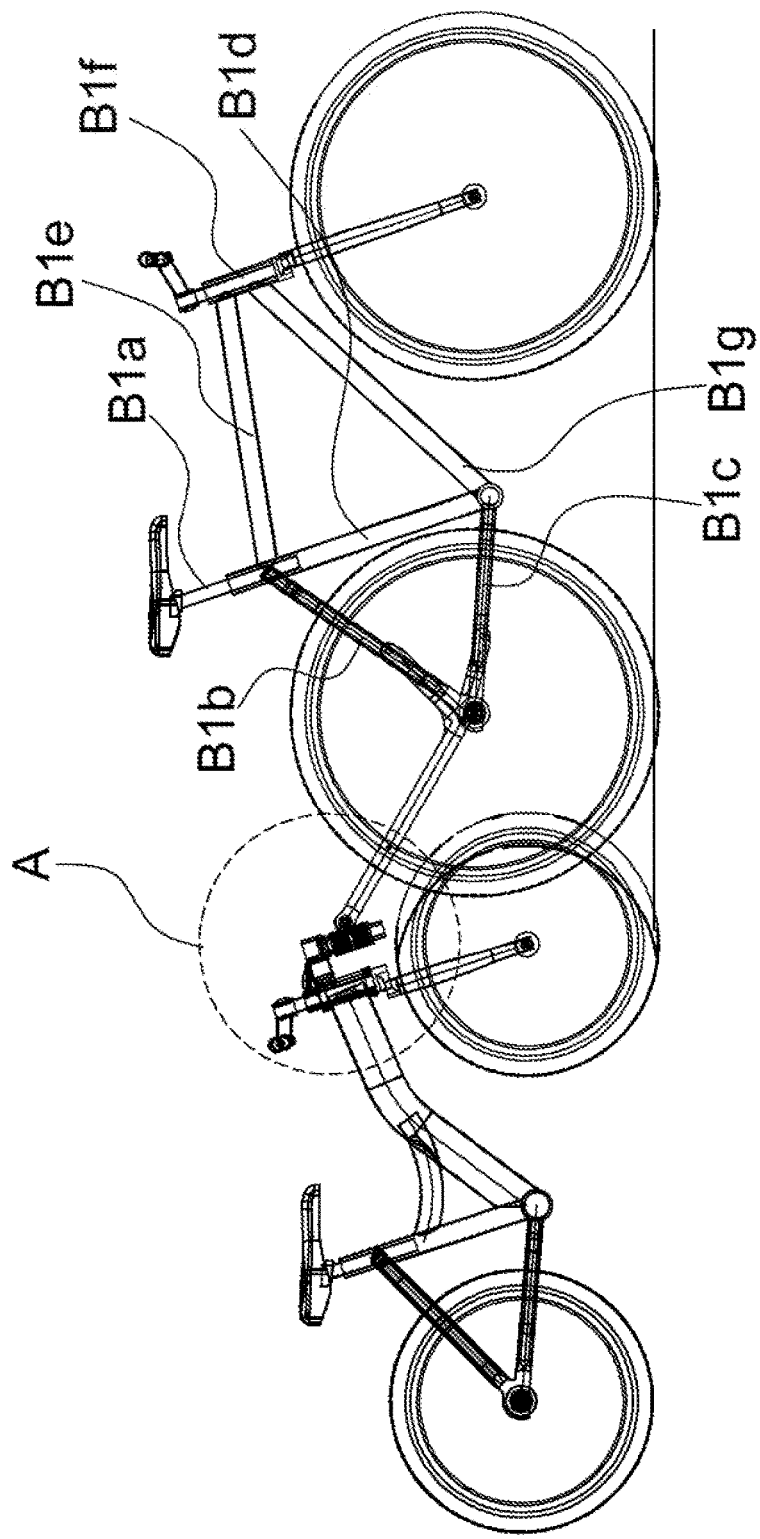
FIG. 2E shows a schematic diagram illustrating a connection portion between the first vehicle body and the second vehicle body.

FIG. 2B and FIG. 2C show enlarged partial diagrams of the vehicle-to-vehicle connector 200, FIG. 2D shows a front view of the vehicle-to-vehicle connector 200 in connection with the first vehicle body B1 and the second vehicle body B2. FIG. 2E specifies a connection portion (indicated by a dashed box A) between the first vehicle body B1 and the second vehicle body B2.

As illustrated in FIG. 2A, the vehicle-to-vehicle connector 200 includes a first component 201 and a second component 202. The first component 201 is configured to be connected to the first vehicle body B1, and the second component 202 is configured to connect the second vehicle body B2 with the first component 201. Note, as shown in FIG. 2B, when the vehicle-to-vehicle connector 200 connects the first vehicle body B1 with the second vehicle body B2, a front wheel assembly (including a front wheel and a front fork) B2a, a stem B2b, and a handle bar B2c of the second vehicle body B2 may lean toward a direction opposite a moving-forward direction F1 of the first vehicle body B1

Accordingly, when the vehicle-to-vehicle connector 200 connects the first vehicle body B1 with the second vehicle body B2, the first vehicle body B1 being ridden may turn to any selected direction, and the second vehicle body B2 is disposed as a follower to be turned following the selected direction of the first vehicle body B1 and moved along with the first vehicle body B1. Note the stem B2b of the second vehicle body B2 is a follower stem and may turn within a limited preset range.

As shown in FIG. 2B and FIG. 2C, the first component 201 includes a first holding member 201a and a force arm 201b. The force arm 201b includes at least one joint 201b1, and the first holding member 201a includes a slot 201a1, a first resilient member 201a2, and a fastening member 201a3. The first holding member 201a may rotate about a first axial direction of the first joint 201b1; therefore, a front wheel of the second vehicle body B2 may move up and down after the connection device 200 connects the first vehicle body B1 with the second vehicle body B2. Under the circumstance, a leaning angle of the front wheel of the second vehicle body B2 is adjustable in the combination of first vehicle body B1 and the second vehicle body B2. For example, a leaning angle of the front wheel of the second vehicle body B2 can be adjusted to allow the front wheel to touch the ground. Accordingly, when two wheels of the second vehicle body B2 are both grounded, the first vehicle body B1 and the second vehicle body B2 altogether may move more smoothly to resolve the problem of an unsteady ride in conventional designs.

Further, the second component 202 may include a second holding member 202a and a direction locking assembly 202b.

The second holding member 202a is configured to connect the first holding member 201a with the stem B2b of the second vehicle body B2. In one embodiment, the second holding member 202b may include a tenon 202a1 and a shaft member 202a2. The tenon 202a1 of the second holding member 202a is connected with the slot 201a1 of the first holding member 201a. In case the tenon 202a1 and the slot 201a1 are connected with each other, the fastening member 201a3 of the first holding member 201a may fix the tenon 202a1 to prevent the rotation of the tenon 202a1. Besides, the first resilient member 201a2 allows the second holding member 202a to move up and down, so that the second vehicle body B2 is well adapted to different levels of the ground. The shaft member 202a2 is configured to fix a head tube of the second vehicle body B2, and the second vehicle body B2 is pulled in a direction determined by the shaft member 202a2 functioning as a rotation shaft. Therefore, the second vehicle body B2 may rotate about a second axial direction perpendicular to the first axial direction to, for example, move the second vehicle body B2 to the side or the back of the first vehicle body B1.

Note, in an alternate embodiment, the first holding member 201a may include a tenon and the second holding member 201b may include a slot. Certainly, the type of the holding members 201a and 201b is not limited to the above embodiments, and the holding members 201a and 201b may be replaced with other existing or future structures. The direction locking assembly 202b may include a fastening member 202b1, a second resilient member 202b2, and a rigid member 202b3. The fastening member 202b1 is configured to fix a shaft of the stem B2b. The second resilient member 202b2 is configured to connect the stem B2b with the second holding member 202a and provide a first reaction force opposite a first action force formed as a result of the rotation of the stem B2b, with the first reaction force forcing the stem B2b to return to a preset position that corresponds to a moving-forward direction of the first vehicle body B1. The rigid member 202b3 is configured to connect the stem B2b with the second holding member 202a to restrict a turning range of the stem B2b.

In one embodiment, when the front wheel assembly B2a of the second vehicle body B2 is applied with a first action force because of road conditions or turning of the handle bar B2c, the second resilient member 202b2 may provide a first reaction force to return the front wheel assembly B2a to an initial position. Further, in case the stem B2b is applied with a greater force, the rigid member 202b3 may restrict the rotation the stem B2b to confine the front wheel assembly B2a to a safe range of turning angles.

As illustrated in FIG. 2E, in one embodiment, the force arm 201b of the first component 201 may include at least one joint 201b1. At least one end of the force arm 201b is fixed on at least one of a seat post B1a, a seat stay B1b, a chain stay B1c, a seat tube B1d, a top tube B1e, head tube B1f and Down tube B1g of the first vehicle body B1, and another end of the force arm 201b is connected with the first holding member 201a. As exemplified in FIG. 2D, the force arm 201b is fixed on the seat stay B1b and the chain stay B1c. Certainly, the force arm 201b is not limited to be disposed in a particular position and may be disposed in any part of a vehicle body or connected to a wheel axle.

Figure 3:
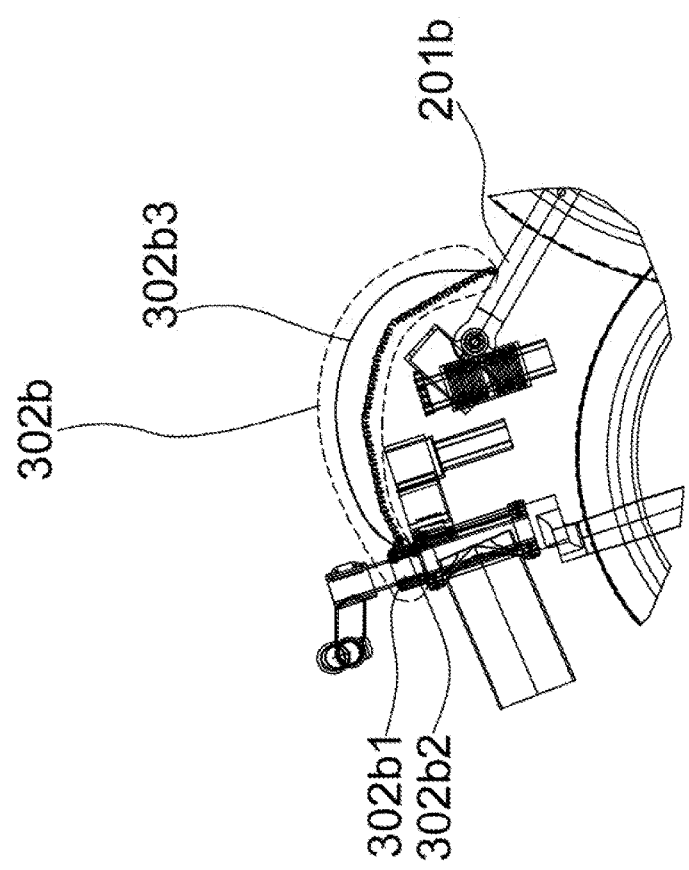
FIG. 3 shows a schematic diagram illustrating a direction locking assembly according to an embodiment of the invention.

FIG. 3 shows a schematic diagram illustrating a direction locking assembly 302b according to another embodiment of the invention. The direction locking assembly 302b may include a fastening member 302b1, a second resilient member 302b2, and a rigid member 302b3. The direction locking assembly 302b is similar to the direction locking assembly 202b shown in FIG. 2B, except that the second resilient member 302b2 is connected with both the stem B2b and the force arm 201b. Therefore, the second resilient member 302b2 may provide a first reaction force opposite a first action force formed as a result of the rotation of the stem B2b to return the stem B2b to a preset position that may correspond to a moving-forward direction of the first vehicle body B1. Moreover, when the first component 201 exerts a second action force on the second component 202 in a moving-forward direction of the first vehicle body B1, the second resilient member 302b2 may provide a second reaction force opposite the second action force. Further, the rigid member 302b3 may reinforce the connection rigidity of the vehicle-to-vehicle connector 200.

Figure 4:
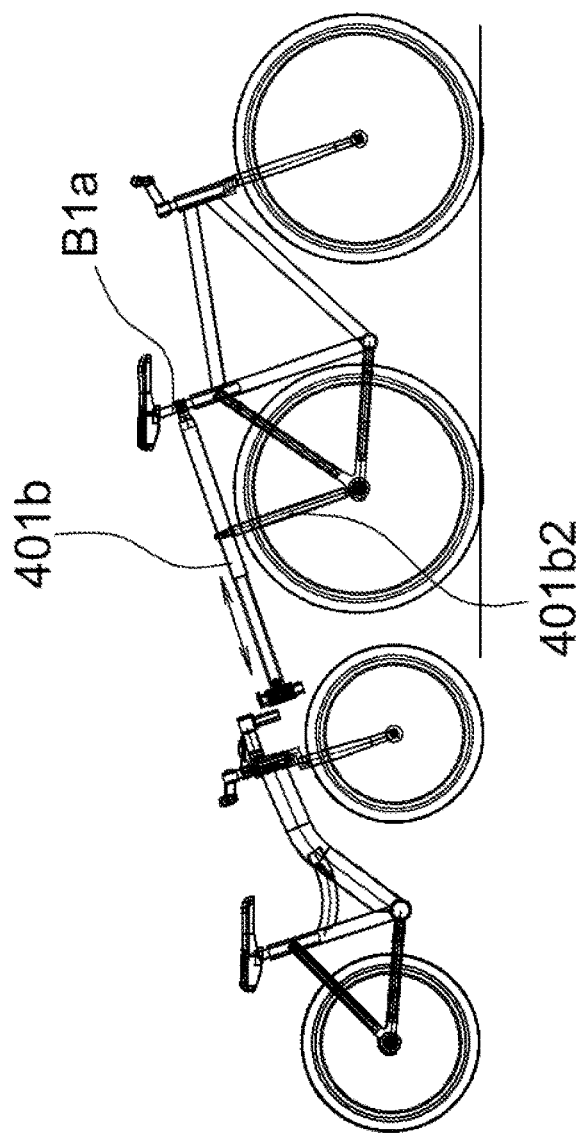
FIG. 4 shows a schematic diagram illustrating a vehicle-to-vehicle connector according to another embodiment of the invention.

Note the force arm may have an alternate structure or arrangement not described in the above embodiments. For example, as shown in FIG. 4, the force arm 401b may be disposed on the seat post B1a of the first vehicle body B1 and connected to a wheel axle of the first vehicle body B1 by a supporting bar 401B2. Further, the force arm 401b may be lengthened or shortened to properly adjust relative positions of the two vehicle bodies B1 and B2.

Note the second vehicle body B2 may be moved to the side or the back of the first vehicle body B1. It should be well understood by persons of ordinary skill in the art, the position of the second vehicle body B2 is not limited to the above embodiments. For example, multiple joints may be used to hold any position of the second vehicle body B2 relative to the first vehicle body B1. In an alternate embodiment, the joints may be replaced with resilient arms or flexible arms to provide a freedom of movement for the connection mechanism. Besides, the freedom of movement may be realized by at least one joint, at least one resilient arm, at least one flexible arm, or a combination thereof.

Figure 5A:
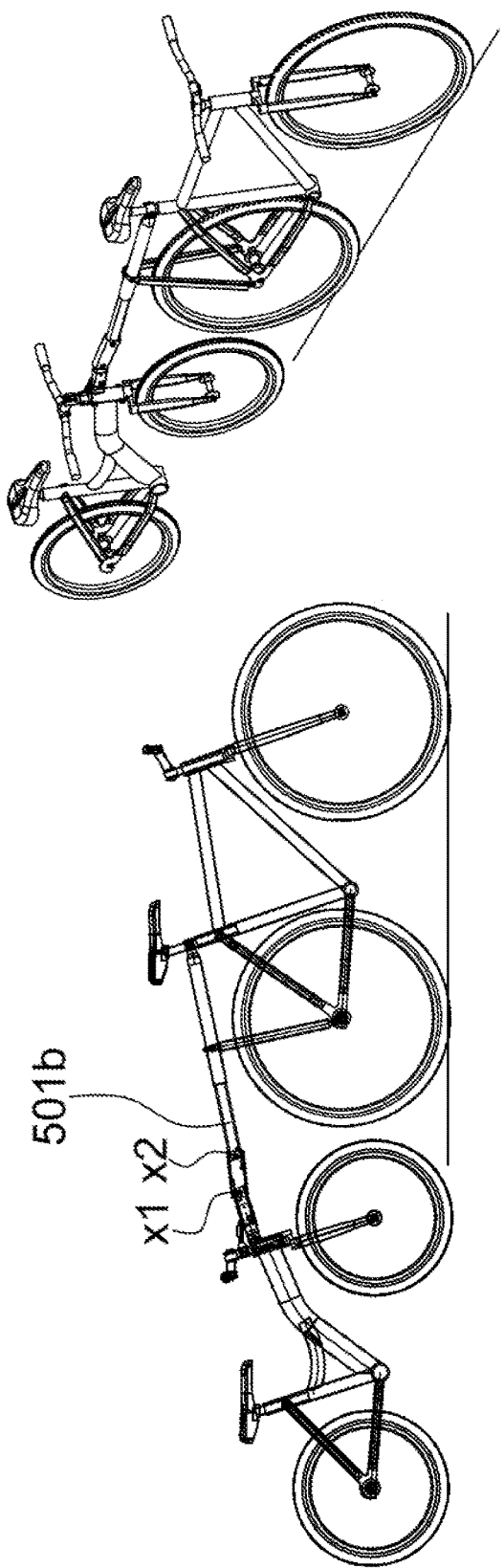
FIG. 5A shows a schematic diagram illustrating a vehicle-to-vehicle connector according to another embodiment of the invention.
Figure 5C:
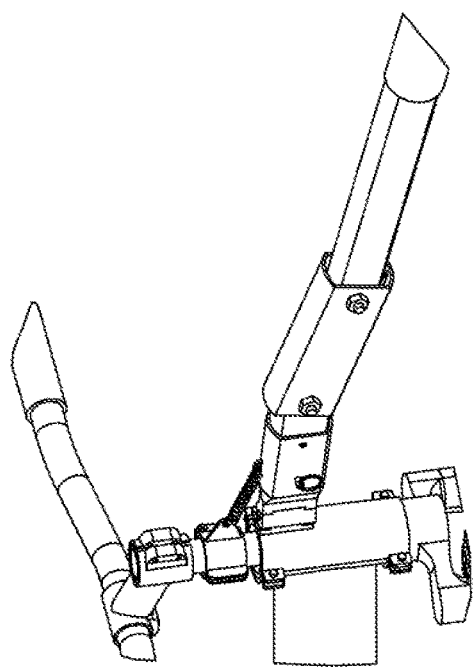
FIG. 5C shows an enlarged partial diagram of the vehicle-to-vehicle connector according to another embodiment of the invention.
Figure 5B:
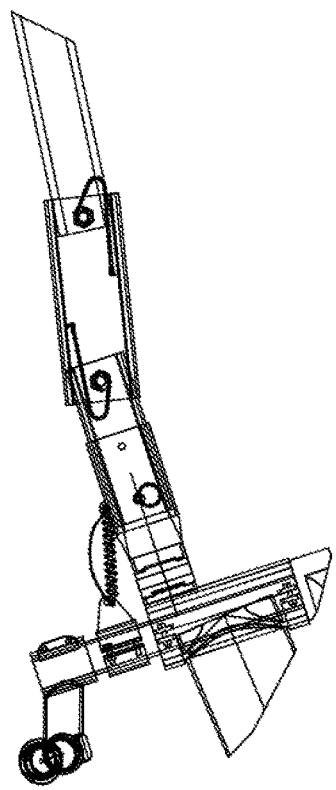
FIG. 5B shows an enlarged partial diagram of the vehicle-to-vehicle connector according to another embodiment of the invention.

In an alternate embodiment, the force arm may have a construction shown in FIG. 5A to FIG. 5C. As illustrated in FIG. 5A, the force arm 501 may cooperate with multiple components to combine the first vehicle body B1 with the second vehicle body B2, and multiple pins X1 and X2 are disposed in the combination to provide firm connection. Each joint in the combination has a preset degree of the freedom of movement, and the combination is exemplified in the right side of FIG. 5A, where the force arm 501 may be provided with a telescopic function. FIG. 5B and FIG. 5C are schematic diagrams illustrating the force arm 501b leaning at different angles and a main part of the vehicle-to-vehicle connector surrounding the force arm 501b. The configuration of the main part of the vehicle-to-vehicle connector shown in FIG. 5B and FIG. 5C may achieve a freedom of movement and connection effects well understood by persons of ordinary skill in the art, thus not explaining in detail here.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A vehicle-to-vehicle connector, comprising:
   a first component configured to be connected with a first vehicle body, wherein the first component comprises a first holding member and a first joint, and the first holding member rotates about a first axial direction of the first joint;
   a second component configured to connect a second vehicle body with the first vehicle body and comprising a second holding member, wherein the second holding member moves up and down to adjust a position of a front wheel of the second vehicle body to allow the front wheel of the second vehicle body to be grounded, wherein the second vehicle body comprises a head tube and a stem, and the second holding member is connected to the first holding member, the head tube of the second vehicle body, and the stem of the second vehicle body.

2. The vehicle-to-vehicle connector as claimed in claim 1, wherein, when the vehicle-to-vehicle connector connects the first vehicle body with the second vehicle body and the first vehicle body turns to move in a selected direction, the second vehicle body is disposed as a follower to be turned following the selected direction of the first vehicle body and moved along with the first vehicle body.

3. The vehicle-to-vehicle connector as claimed in claim 2, wherein the stem of the second vehicle body turns within a limited preset range.

4. The vehicle-to-vehicle connector as claimed in claim 1, wherein the second component comprises a direction locking assembly, and the direction locking assembly comprises:
a fastening member configured to fix a shaft of the stem;
a second resilient member configured to connect the stem with the second holding member and provide a first reaction force opposite a first action force formed as a result of the rotation of the stem, with the first reaction force forcing the stem to return to a preset position; and
a rigid member configured to connect the stem with the second holding member to restrict a turning range of the stem.

5. The vehicle-to-vehicle connector as claimed in claim 4, wherein, when the first component exerts a second action force on the second component, the second resilient member provides a second reaction force opposite the second action force.

6. A vehicle-to-vehicle connector, comprising:
a first component configured to be connected with a first vehicle body, wherein the first component comprises a first holding member and a force arm, at least one end of the force arm is fixed on at least one of a seat post, a seat stay, a chain stay, a seat tube, a top tube, a head tube and a down tube of the first vehicle body, and another end of the force arm is connected with the first holding member; and
a second component configured to connect a second vehicle body with the first vehicle body, wherein the second vehicle body comprises a front wheel assembly, a stem and a handle bar, and the front wheel assembly, the stem and the handle bar lean toward a direction opposite a moving-forward direction of the first vehicle body.

7. The vehicle-to-vehicle connector as claimed in claim 6, wherein the first component further comprises a first joint, the first holding member rotates about a first axial direction of the first joint, the force arm comprises at least one second joint, and the second joint rotates about a second axial direction to move the second vehicle body to the side or the back of the first vehicle body.

8. The vehicle-to-vehicle connector as claimed in claim 1, wherein the second holding member comprises:
a tenon connected with a slot of the first holding member; and
a shaft member configured to fix the head tube of the second vehicle body and functioning as a rotation shaft, wherein the second vehicle body is pulled in a direction determined by the shaft member.

9. The vehicle-to-vehicle connector as claimed in claim 8, wherein the first holding member comprises:
a fastening member for fixing the tenon to prevent rotation of the tenon when the tenon is connected with the slot; and
a first resilient member enabling the second holding member to move up and down corresponding to different levels of the ground, so that the second vehicle body is adapted to the different levels of the ground.

10. The vehicle-to-vehicle connector as claimed in claim 7, wherein the force arm is capable of being lengthened or shortened to adjust relative positions of the first vehicle body and the second vehicle body.

11. The vehicle-to-vehicle connector as claimed in claim 6, wherein the second component comprises at least one joint, at least one resilient arm, at least one flexible arm, or a combination thereof to realize a freedom of movement.

* * * * *